US012711676B2

(12) United States Patent
Vaikundam et al.

(10) Patent No.: US 12,711,676 B2
(45) Date of Patent: Aug. 18, 2026

(54) METHODS AND SYSTEMS FOR GENERATING GRAPH REPRESENTATIONS OF A SCENE

(71) Applicant: Continental Automotive Technologies GmbH, Hannover (DE)

(72) Inventors: Sriram Vaikundam, Singapore (SG); Michael Colin Hoy, Singapore (SG); Paththini Gedara Chaminda Namal Senarathne, Singapore (SG); Rahul Singh, Singapore (SG)

(73) Assignee: AUMOVIO Germany GmbH, Frankfurt am Main (DE)

( * ) Notice: Subject to any disclaimer, the term of this patent is extended or adjusted under 35 U.S.C. 154(b) by 150 days.

(21) Appl. No.: 18/466,870

(22) Filed: Sep. 14, 2023

(65) Prior Publication Data

US 2024/0087189 A1 Mar. 14, 2024

(30) Foreign Application Priority Data

Sep. 14, 2022 (EP) .................................... 20195493

(51) Int. Cl.
*G06T 11/26* (2026.01)
*G06V 10/426* (2022.01)
*G06V 10/82* (2022.01)

(52) U.S. Cl.
CPC ............ *G06T 11/26* (2026.01); *G06V 10/426* (2022.01); *G06V 10/82* (2022.01); *G06V 2201/07* (2022.01)

(58) Field of Classification Search
None
See application file for complete search history.

(56) References Cited

U.S. PATENT DOCUMENTS

2002/0158880 A1* 10/2002 Williams ................ G06T 17/20
345/582
2021/0150771 A1 5/2021 Huang
2021/0192254 A1* 6/2021 Rejeb Sfar ............... G06N 3/08
(Continued)

FOREIGN PATENT DOCUMENTS

CN 103248170 A 8/2013
CN 110598770 A 12/2019

OTHER PUBLICATIONS

European Search Report dated Mar. 15, 2023 for European Patent Application No. 22195493.6 to which this application claims priority.

(Continued)

*Primary Examiner* — Jason A Pringle-Parker

(57) ABSTRACT

A computer-implemented system and method of generating a graph representation of a scene comprising receiving sensor data representative of a perceived scene captured with a sensor; defining a plurality of nodes based on the received sensor data; creating a densely connected graph by connecting each node to a number of nearest neighbour nodes; predicting, for each pair of connected nodes of the densely connected graph, at least a node probability, wherein the node probability represents a probability that the pair of connected nodes represent the same object; and generating a graph representation of the perceived scene based at least on the densely connected graph, and the predicted node probability. The method may also be applied to two or more observations of a scene.

4 Claims, 9 Drawing Sheets

(56) References Cited

U.S. PATENT DOCUMENTS

| | | | | |
|---|---|---|---|---|
| 2021/0295093 | A1* | 9/2021 | Pan | G06V 20/58 |
| 2022/0067233 | A1* | 3/2022 | Blackwell, II | A63F 13/65 |

OTHER PUBLICATIONS

Yang Jianwei et al., "Graph R-CNN for Scene Graph Generation", Oct. 6, 2018 (Oct. 6, 2018), Oct. 6, 2018, pp. 690-706, XP047635262, [retrieved on Oct. 6, 2018].

Shih-Yuan Yu et al., "Scene-Graph Augmented Data-Driven Risk Assessment of Autonomous Vehicle Decisions", arxiv.org, Cornell University Library, 201 Olin Library Cornell University Ithaca, NY 14853, Aug. 31, 2020 (Aug. 31, 2020), XP081761114.

Arnav V Malawade et al: "Spatio-Temporal Scene-Graph Embedding for Autonomous Vehicle Collision Prediction", arxiv.org, Cornell University Library, 201 Olin Library Cornell University Ithaca, NY 14853, Nov. 11, 2021 (Nov. 11, 2021), XP091096153.

Monica Riccardo et al: "Multi-label Point Cloud Annotation by Selection of Sparse Control Points", 2017 International Conference on 3D Vision (3DV), IEEE, Oct. 10, 2017 (Oct. 10, 2017), pp. 301-308, XP033353200, DOI: 10.1109/3DV.2017.00042 [retrieved on Jun. 6, 2018].

Charles R Qi et al: "PointNet: Deep Learning on Point Sets for 3D Classification and Segmentation", arxiv.org, Cornell University Library, 201 Olin Library Cornell University Ithaca, NY 14853, Dec. 2, 2016 (Dec. 2, 2016), XP080736277, DOI: 10.1109/CVPR.2017.16.

Nawaz Waqas et al., "Intra graph clustering using collaborative similarity measure", Distributed and Parallel Databases, Kluwer, NL, vol. 33, No. 4, Jan. 20, 2015 (Jan. 20, 2015), pp. 583-603, XP035530950, ISSN: 0926-8782, DOI: 10.1007/S10619-014-7170-X.

Thomas N Kipf et al., "Semi-Supervised Classification with Graph Convolutional Networks", Conference ICLR 2017, Feb. 22, 2017 (Feb. 22, 2017), XP055457092.

Danfei Xu et al., "Scene Graph Generation by Iterative Message Passing", Art 84 arxiv.org, Cornell University Library, 201 Olin Library Cornell University Ithaca, NY 14853, Jan. 10, 2017 (Jan. 10, 2017), XP080740455, DOI: 10.1109/CVPR.2017.330.

Yuren Con et al., "Spatial-Temporal Transformer for Dynamic Scene Graph Generation", 18th IEEE/CVF International Conference on Computer Vision Workshops, ICCVW 2021, pp. 16352-16362, ISBN (Electronic) 978-1-6654-2812-5, arXiv:2107.12309 [cs.CV].

Charles R Qi et a., "PointNet++: Deep Hierarchical Feature Learning on Point Sets in a Metric Space", Jun. 2017, arXiv:1706.02413 [cs.CV].

Satoshi Tsutsui et al., "Scene Graph Generation from Images", 2016.

Yikang Li et al., "Scene Graph Generation from Objects, Phrases and Region Captions", 2017 IEEE International Conference on Computer Vision (ICCV), Jul. 31, 2017, DOI:10.1109/ICCV.2017.142, arXiv:1707.09700 [cs.CV].

Angela Dai et al, "ScanNet: Richly-annotated 3D Reconstructions of Indoor Scenes", 2017 IEEE Conference on Computer Vision and Pattern Recognition (CVPR), Jul. 21-26, 2017, DOI: 10.1109/CVPR.2017.261, arXiv:1702.04405 [cs.CV].

Yin Zhou et al., "VoxelNet: End-to-End Learning for Point Cloud Based 3D Object Detection", 2018 IEEE/CVF Conference on Computer Vision and Pattern Recognition, Jun. 18-23, 2018, DOI: 10.1109/CVPR.2018.00472, arXiv:1711.06396 [cs.CV].

Sekunde, "3D-SIS: 3D Semantic Instance Segmentation of RGB-D Scans (CVPR2019 Oral)", https://github.com/Sekunde/3D-SIS#Overview.

Ximing Yang et al., "Generate Point Clouds with Multiscale Details from Graph-Represented Structures", arXiv:2112.06433 [cs.CV], Mar. 9, 2022.

Hugues Thomas et al., "KPConv: Flexible and Deformable Convolution for Point Clouds", 2019 IEEE/CVF International Conference on Computer Vision (ICCV), Oct. 27, 2019-Nov. 2, 2019, DOI: 10.1109/ICCV.2019.00651, arXiv:1904.08889 [cs.CV].

Johanna Wald et al., "Learning 3D Semantic Scene Graphs from 3D Indoor Reconstructions (CVPR 2020)", 2020 IEEE/CVF Conference on Computer Vision and Pattern Recognition (CVPR), Jun. 13-19, 2020, DOI: 10.1109/CVPR42600.2020.00402, arXiv:2004.03967 [cs.CV].

Dong Wook Shu et al., "3D Point Cloud Generative Adversarial Network Based on Tree Structured Graph Convolutions", IEEE/CVF International Conference on Computer Vision (ICCV), 2019, pp. 3859-3868, arXiv:1905.06292 [cs.CV].

Nuscenes By Motional, https://www.nuscenes.org/nuscenes.

SemanticKITTI—A Dataset for LiDAR-based Semantic Scene Understanding, http://semantic-kitti.org.

Xiaojun Chang et al., "Scene Graphs: A Survey of Generations and Applications", DOI: 10.48550/arXiv.2104.01111, arXiv:2104.01111 [cs.CV].

Dilara Gokay et al., "Graph2Pix: A Graph-Based Image to Image Translation Framework", Technische Universität München Boğaziçi University, arXiv:2108.09752 [cs.CV].

* cited by examiner 404
224
Connecting k-nearest neighbours
432

504
504
540
Input nodes
548
556
556
564
572a
572b
Node probability
580
Edge probability
588

METHODS AND SYSTEMS FOR GENERATING GRAPH REPRESENTATIONS OF A SCENE

CROSS-REFERENCE TO RELATED APPLICATIONS

The present application claims the priority from European Patent Application No. 22195493.6 filed on Sep. 14, 2022, the content of which is herein incorporated by reference.

BACKGROUND

1. Field

Embodiments of the present application relate generally to sensor data processing, and more specifically to methods and systems for processing sensor data of a captured scene to generate scene graphs, which are graph representations of a captured scene. Furthermore, embodiments of the present application relate to the generated graph representation and applications of the generated graph representation.

2. Description of Related Art

A scene graph, or a graph representation of a scene, is a representation of a scene. Scene graphs structurally and explicitly express the objects and their attributes, as well as relationships between objects in a scene. Generally, a scene graph comprises nodes and edges which connect the nodes, wherein the nodes represent various objects of a scene, and the edges represent the relationships between the objects. Each node can encode information regarding the attribute of an object, such as the class, identity, location, colour, shape, size of an object.

Scene graphs are used in various applications, including visual place recognition, topological localization, and autonomous navigation. For example, scene graphs are used in autonomous navigation to abstract the metric map and enable an autonomous agent (e.g., autonomous vehicle or robot) to navigate using relationships learnt between the different objects within a scene.

Current methods of generating or constructing scene graphs are directed towards constructing a scene graph indoors, or a small multi-level environment or from a three-dimensional (3D) model. These methods are generally not scalable to large outdoor environments because these methods focus on spatial and/or contact relationship between objects and therefore do not work well with long term object and/or scene reidentification that is required for loop closure.

SUMMARY

Aspects and objects of embodiments of the present application improve the generation of scene graphs by generating spatially consistent graph representations of a scene, said graph representation comprising a plurality of nodes and edges, wherein a node represents an object within the scene, and wherein an edge connects pairs of nodes of the plurality of nodes and represents a spatial relationship between objects within the scene. By generating a spatially consistent graph scene, a large dynamic scene graph can be generated by aggregating new observations over large distances. The generated graph representation may be used in various applications such as visual place recognition, topological localization, and autonomous navigation.

It shall be noted that all embodiments concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

To solve the above technical problems, an embodiment provides a computer-implemented method of generating a graph representation of a scene based on a single observation of the scene, said graph representation comprising a plurality of nodes and edges, wherein a node represents an object within the scene, and wherein an edge connects pairs of nodes of the plurality of nodes and represents a spatial relationship between objects within the scene, the method including receiving sensor data representative of a perceived scene captured with a sensor; defining a plurality of nodes based on the received sensor data; creating a densely connected graph by connecting each node to a number of nearest neighbour nodes; predicting, for each pair of connected nodes of the densely connected graph, at least a node probability, wherein the node probability represents a probability that the pair of connected nodes represent the same object; and generating a graph representation of the perceived scene based at least on the densely connected graph, and the predicted node probability.

The computer-implemented method may be advantageous over known methods as the graph representation of a scene generated is robust to changes in the scene or environment and is invariant to rotation. Furthermore, precise pose information is not required to compute the relationship between different objects of a scene. The computer-implemented method starts by generating a plurality of nodes, each node representing an object within the perceived scene. The plurality of nodes is densely connected before the nodes and connections are pruned to form the graph representation of the perceived scene. As it is difficult to annotate the nodes and edge connections for ground truth on a synthetic or real scene graph, it is advantageous to start with more information by densely connecting the plurality of nodes and then pruning the graph based on node probability as it would allow the network to learn the most important edges required for accurate scene reconstruction. Furthermore, predicting a node probability and generating the graph representation of the perceived scene based on the predicted node probability is advantageous as the resulting graph representation would be more accurate as any duplicate nodes that represent the same object within the scene would be addressed.

A preferred method of an embodiment is a computer-implemented method as described above, wherein defining a plurality of nodes based on the captured perceived scene includes identifying one or more objects within the perceived scene based on the received sensor data; determining whether each identified object is an object of interest, wherein an object of interest is preferably a static object; and defining a plurality of nodes, wherein each node corresponds to an object of interest within the perceived scene.

The above-described aspect has the advantage that the resulting graph representation focuses on the more important objects of interest within a scene, in particular, static objects which are unchanging across scenes. This allows the graph representation to be built up by aggregating new observations over large distances as the objects represented by the nodes of the graph representation would remain consistent and unchanging over multiple observations taken during a short time period.

The above-described advantageous aspects of a computer-implemented method also hold for all aspects of a below-described computer-implemented methods. All below-described advantageous aspects of a computer-implemented methods also hold for all aspects of an above-described computer-implemented methods.

Aspects and objects of embodiments of the present application also relate to a computer-implemented method of generating a graph representation of a scene from a first observation and a second observation of the scene, the method including providing a first graph representation generated from a first observation and a second graph representation generated from a second observation, wherein each graph representation comprises a plurality of connected nodes, and wherein the first graph representation and second graph representation are presented on a single coordinate system; creating a densely connected graph by connecting each node to a number of nearest neighbour nodes; predicting, for each pair of connected nodes of the densely connected graph, at least a node probability, wherein the node probability represents a probability that the pair of connected nodes represent the same object; and generating a third graph representation of the scene based at least on the densely connected graph, and the predicted node probability.

The computer-implemented method may be advantageous over known methods as the graph representation of a scene generated is robust to changes in the scene or environment and is invariant to rotation. The nodes and edges from a first graph representation and a second graph representation are presented on a single coordinate system and further densely connected before the nodes and connections are pruned to form an aggregated graph representation. As it is difficult to annotate the nodes and edge connections for ground truth on a synthetic or real scene graph, it is advantageous to start with more information by densely connecting the plurality of nodes and then pruning the graph based on node probability as it would allow the network to learn the most important edges required for accurate scene reconstruction. Furthermore, predicting a node probability and generating the graph representation of the perceived scene based on the predicted node probability is advantageous for aggregating a larger graph representation based on two or more graph representations as any duplicate nodes that represent the same object within the scene would be addressed and the spatial relationships between objects would be preserved.

A preferred method may be a computer-implemented method as described above or as described above as preferred, wherein the first graph representation and/or the second graph representation is generated using a computer-implemented method of the present application.

The above-described aspect of the present application has the advantage that the graph representation generated using a computer-implemented method of the present application is spatially consistent and thus may be suitable for aggregating or accumulating over multiple observations over large distances in a short period of time.

A preferred method of the present application is a computer-implemented method as described above or as described above as preferred, wherein generating a graph representation of the perceived scene based on the densely connected graph, and the predicted node probability and/or generating a third graph representation of the scene based at least on the densely connected graph, and the predicted node probability comprises merging pairs of nodes where the node probability is above a first threshold, wherein the first threshold is preferably above 0.7.

The above-described aspect of the present application has the advantage of reducing errors within the generated graph representation as duplicate nodes that represent the same object in a scene are merged. Duplicate notes may be generated due to incorrect feature extraction and/or noisy data. The higher the node probability, the more likely that the nodes represent the same object.

A preferred method of the present application is a computer-implemented method as described above or as described above as preferred, wherein predicting, for each pair of connected nodes of the densely connected graph, at least a node probability further comprises predicting, for each pair of connected nodes, an edge probability, wherein the edge probability represents a probability of an edge between the pair of nodes; and wherein generating a graph representation and/or generating a third graph representation is further based on the edge probability.

The above-described aspect of the present application has the advantage that predicting an edge probability allows further pruning of the graph representation, such that any unimportant edges or connections are removed. The removal of unimportant edges or connections is important for subsequent applications that might require reconstruction of the scene based on the generated graph representation.

A preferred method of the present application is a computer-implemented method as described above or as described above as preferred, wherein generating a graph representation and/or generating a third representation comprises removing an edge connecting a pair of connected nodes where the predicted edge probability is below a second threshold, wherein the second threshold is preferably below 0.5.

The above-described aspect of the present application has the advantage that the resulting graph representation is further pruned as any edges that have a low probability are removed. The removal of unimportant edges or connections is important for subsequent applications that might require reconstruction of the scene based on the generated graph representation.

A preferred method of the present application is a computer-implemented method as described above or as described above as preferred, wherein a trained neural network is used to predict, for each pair of connected nodes, a node probability and optionally an edge probability, wherein the trained neural network preferably has a multilayer perceptron (MLP) architecture.

The above-described aspect of the present application has the advantage that using a trained neural network allows the learning and modelling of non-linear and complex relationships and subsequent application to new datasets or input. In addition, neural networks have the ability to learn by themselves and product an output that is not limited to the input provided. A multilayer perceptron (MLP) architecture is preferred as it can be applied to complex non-linear problems, works well with large input data, and provides quick predictions after training. A MLP can also generalize and infer unseen relationships on unseen data after it has been trained. A MLP is also preferred as it does not impose any restrictions on the inputs.

The above-described advantageous aspects of a computer-implemented method of the application also hold for all aspects of a below-described computer-implemented method of the application. All below-described advantageous aspects of a computer-implemented method of the application also hold for all aspects of an above-described computer-implemented method of the application.

Aspects and objects of embodiments of the present application also relate to a computer-implemented method of training a neural network for predicting a node probability and an edge probability for a graph representation of a scene, said graph representation comprising a plurality of nodes and edges, wherein anode represents an object within the scene, and wherein an edge connects pairs of nodes of the plurality of nodes and represents a spatial relationship between objects within the scene, the method including receiving a training dataset comprising a plurality of densely connected graphs generated from a plurality of sensor data captured from a plurality of scenes; for each densely connected graph: receiving as input pairs of connected nodes of the densely connected graph; producing an output for each input pair of connected nodes of the densely connected graphs of the training dataset, comprising a predicted edge probability and node probability, wherein the node probability represents a similarity between the pair of nodes and the edge probability represents a probability of an edge between the pair of nodes; generating a graph representation based on the densely connected graph, the predicted edge probabilities, and the predicted node probabilities; reconstructing the scene based on the generated graph representation; comparing the reconstructed scene against the corresponding sensor data that the densely connected graph was generated from; and adjusting the neural network by using a cost function that enforces consistency between the reconstructed scene and the corresponding input sensor data.

The computer-implemented method of the present application is advantageous over known methods as the neural network is trained through multiple iterations to generate accurate predicted node probabilities and edge probabilities by comparing scenes reconstructed from the generated graph representation against the original observed scene, also known as the ground truth. The neural network is also learning to form correct edges between different nodes or objects in an observation without explicitly learning from external pose inputs or ground truth graphs of an observation, therefore learning to weigh edges that are most essential for an accurate reconstruction of an observation.

The above-described advantageous aspects of a computer-implemented method of the application also hold for all aspects of a below-described computer-implemented method of the application. All below-described advantageous aspects of a computer-implemented method of the application also hold for all aspects of an above-described computer-implemented method of the application.

Aspects and objects of embodiments of the present application also relate to a computer-implemented method of generating a training dataset for a neural network, in particular the neural network of the computer-implemented method of the application, including receiving a plurality of sensor data captured from a plurality of scenes; and defining, for each input sensor data, a plurality of nodes and creating a densely connected graph by connecting each node to a number of nearest neighbour nodes, wherein each node represents an object within the scene.

The above-described advantageous aspects of a computer-implemented method of the application also hold for all aspects of a below-described training dataset of the application. All below-described advantageous aspects of a training dataset of the application also hold for all aspects of an above-described computer-implemented method of the application.

Aspects and objects of the present application also relate to a training dataset for a neural network, in particular the neural network of a computer-implemented method of the application, generated using the computer-implemented method of the application.

The above-described advantageous aspects of a computer-implemented method or training dataset of the application also hold for all aspects of a below-described graph representation of the application. All below-described advantageous aspects of a graph representation of the application also hold for all aspects of an above-described computer-implemented method or training dataset of the application.

Aspects and objects of embodiments of the present application also relate to a graph representation of a scene generated according to the computer-implemented method of the application, wherein each node comprises a node position and/or at least one node feature, wherein the node position corresponds to a spatial position of an object, preferably a spatial position of a centroid of the object, and node feature corresponds to one or more attributes of the object.

The above-described aspect of the present application has the advantage that the generated graph representation stores or encodes information of the attributes of the objects and also spatial relationships of the objects. The generated graph representation may thus be used to track any changes in a scene or a location over time. The generated graph representation may also be used to track changes to particular nodes or objects over time and may still be used to identify a scene based on the node relationships in the graph representation.

The above-described advantageous aspects of a computer-implemented method, training dataset, or graph representation of the application also hold for all aspects of below-described uses of a graph representation of the application. All below-described advantageous aspects of uses of a graph representation of the application also hold for all aspects of an above-described computer-implemented method, training dataset, or graph representation of the application.

Aspects and objects of embodiments of the present application also relate to use of a graph representation of a scene generated according to the computer-implemented method for at least one of: visual place recognition; topological localisation; and autonomous navigation.

The above-described advantageous aspects of a computer-implemented method, training dataset, graph representation, or uses of the graph representation of the application also hold for all aspects of below-described system of the application. All below-described advantageous aspects of a system of the application also hold for all aspects of an above-described computer-implemented method, training dataset, graph representation, or uses of the graph representation of the application.

Aspects and objects of the present application also relate to a system comprising one or more sensors, one or more processors and a memory that stores executable instructions for execution by the one or more processors, the executable instructions comprising instructions for performing a computer-implemented method according to the application.

The above-described advantageous aspects of a computer-implemented method, training dataset, graph representation, uses of the graph representation, or system of the application also hold for all aspects of below-described computer program, a machine-readable storage medium, or a data carrier signal of the application. All below-described advantageous aspects of a computer program, a machine-readable storage medium, or a data carrier signal of the application also hold for all aspects of an above-described computer-implemented method, training dataset, graph representation, uses of the graph representation, or system of the application.

Aspects and embodiments of the present application also relate to a computer program, a machine-readable storage medium, or a data carrier signal that comprises instructions, that upon execution on a data processing device and/or control unit, cause the data processing device and/or control unit to perform the steps of a computer-implemented method according to the application. The machine-readable medium may include any medium and/or mechanism for storing or transmitting information in a form readable by a machine (e.g., a computing device). The machine-readable medium may be any medium, such as for example, read-only memory (ROM); random access memory (RAM); a universal serial bus (USB) stick; a compact disc (CD); a digital video disc (DVD); a data storage device; a hard disk; electrical, acoustical, optical, or other forms of propagated signals (e.g., digital signals, data carrier signal, carrier waves), or any other medium on which a program element as described above can be transmitted and/or stored.

As used in this summary, in the description below, in the claims below, and in the accompanying drawings, the term "sensor" includes any sensor that detects or responds to some type of input from a perceived environment or scene. Examples of sensors include cameras, video cameras, LiDAR sensors, radar sensors, depth sensors, light sensors, colour sensors, or red, green, blue, and distance (RGBD) sensors.

As used in this summary, in the description below, in the claims below, and in the accompanying drawings, the term "sensor data" means the output or data of a device, also known as a sensor, that detects and responds to some type of input from the physical environment.

As used in this summary, in the description below, in the claims below, and in the accompanying drawings, the term "scene" refers to a distinct physical environment that may be captured by one or more sensors. A scene may include one or more objects that may be captured by one or more sensors, whether such object is stationary, static, or mobile.

BRIEF DESCRIPTION OF THE DRAWINGS

These and other features, aspects, and advantages will become better understood with regard to the following description, appended claims, and accompanying drawings where:

In the drawings, like parts are denoted by like reference numerals.

Figure 1:
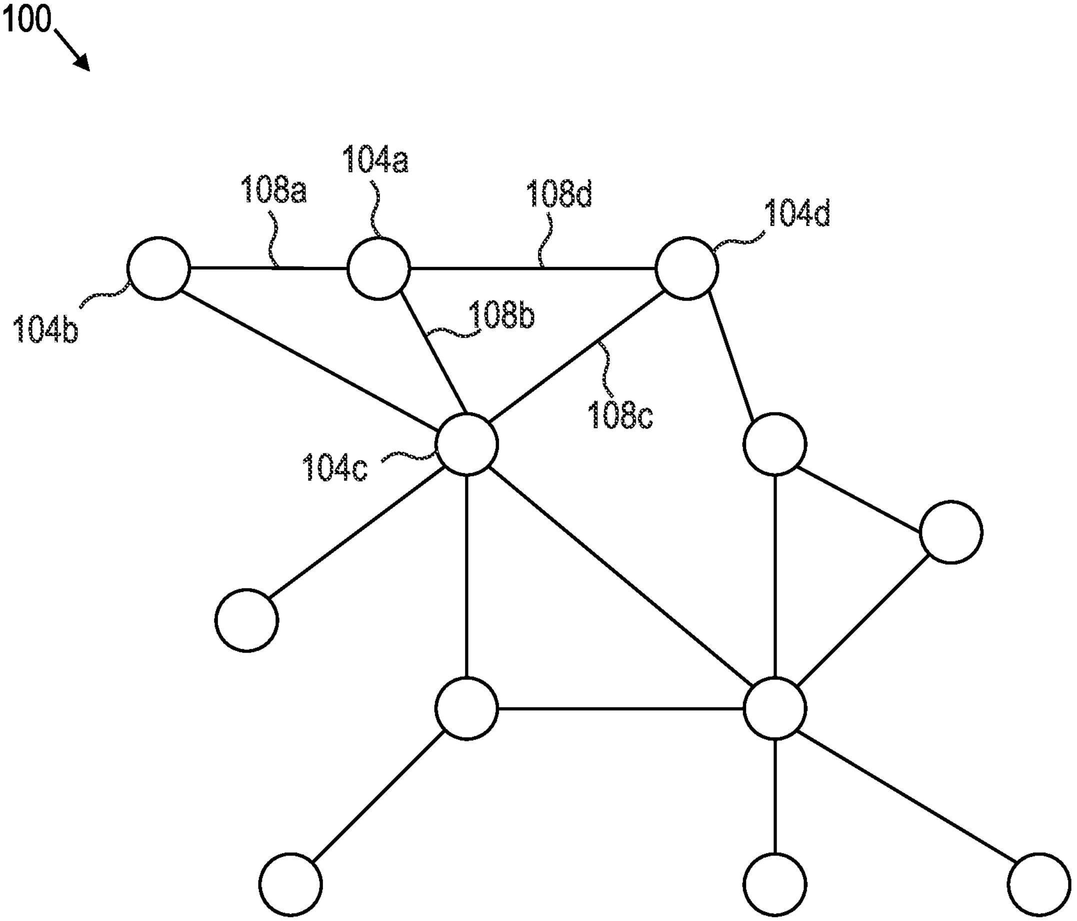
FIG. 1 is a schematic illustration of a graph representation of a scene, in accordance with embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the summary above, in this description, in the claims below, and in the accompanying drawings, reference is made to particular features (including method steps) of the embodiment. It is to be understood that the disclosure of the embodiment in this specification includes all possible combinations of such particular features. For example, where a particular feature is disclosed in the context of a particular aspect or embodiment of the application, or a particular claim, that feature can also be used, to the extent possible, in combination with and/or in the context of other particular aspects and embodiments of the application.

In the present document, the word "exemplary" is used herein to mean "serving as an example, instance, or illustration." Any embodiment or implementation of the present subject matter described herein as "exemplary" is not necessarily be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The present disclosure is directed to methods, systems, neural networks, methods of training neural networks, training datasets, computer programs, data carrier signals, for generating a graph representation of a scene based on sensor data obtained of the scene. The graph representation comprises a plurality of nodes and edges, wherein a node represents an object within the scene, and wherein an edge connects pairs of nodes of the plurality of nodes and represents a spatial relationship between objects within the scene. Embodiments of the present disclosure can utilise trained neural networks for the prediction of node probability and optionally, edge probability, to identify errors in identification of objects, as well as for the reconstruction of the captured scene. The graph representation is spatially consistent and can be aggregated or accumulated over multiple observations to generate a large spatially consistent graph representation that may be used for various applications such as visual place recognition, topological localisation, and autonomous navigation. It is also particularly advantageous as generation of the graph representation uses less information as it does not require explicit pose information and may be more computationally and storage efficient.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graph representation could be termed a second graph representation, and, similarly, a graph representation could be termed a first graph representation, without departing from the scope of the various described embodiments. The first graph representation and the second graph representation are both graph representations, but they are not the same graph representation.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method. It must also be noted that as used herein and in the appended claims, the singular forms "a," "an," and "the" include plural references unless the context clearly dictates otherwise.

FIG. 1 is a schematic illustration of a graph representation of a scene, in accordance with embodiments of the present disclosure. Graph representation 100 of a scene comprises a plurality of nodes 104 and edges 108, wherein an edge 108 connects pairs of nodes 104 of the plurality of nodes 104. Each node 104 may be connected to any number of nodes 104. For example, node 104*a* is connected to three other nodes: node 104*b* through edge 108*a*, node 104*c* through edge 108*b* and node 104*d* through edge 108*d*.

According to some embodiments, each node 104 represents an object within a scene. In some embodiments, each node 104 may comprise a node position, wherein the node position corresponds to a spatial position of an object. The spatial position of the object may be represented on any known coordinate system. Preferably, the node position corresponds to a spatial position of a centroid or center point of the object. In some embodiments, each node 104 may comprise at least one node feature, wherein a node feature corresponds to one or more attributes of the object. Examples of attributes include an object class, object colour, object shape, object location, spatial relationship with other objects, and features encoded using neural networks with raw sensor data, such as image or points from a lidar. In some embodiments, the one or more attributes may be aggregated before being stored as a node feature or at least one node feature.

Figure 2:
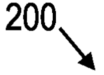
FIG. 2 is a schematic illustration of a method of generating a graph representation of a scene based on a single observation of the scene, in accordance with embodiments of the present disclosure.
Figure 2:
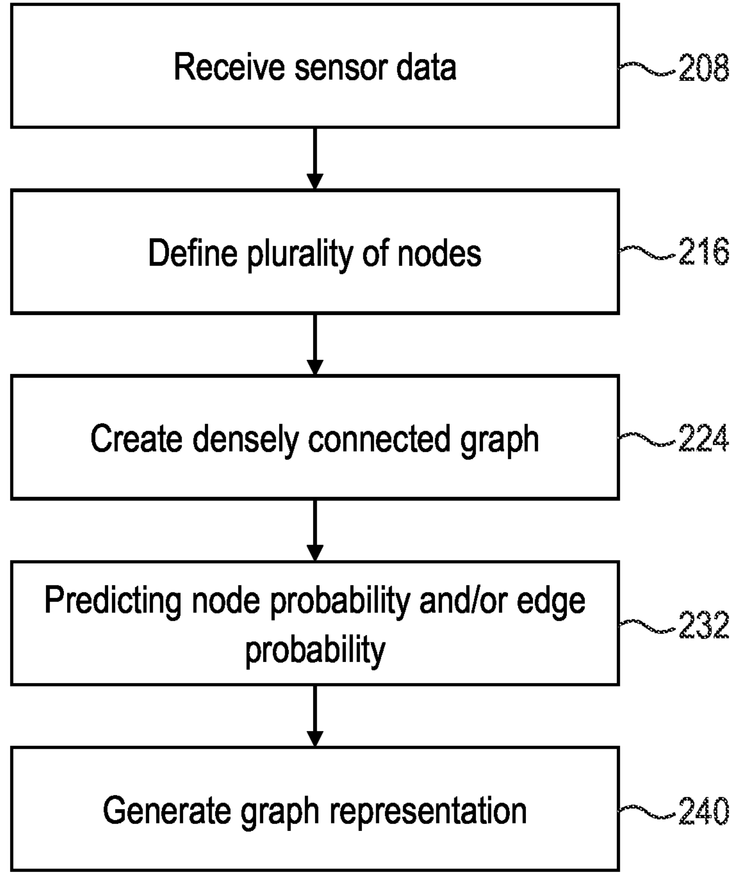

FIG. 2 is a schematic illustration of a method of generating a graph representation of a scene based on a single observation of the scene, in accordance with embodiments of the present disclosure. Method 200 of generating a graph representation 100 of a scene based on a single observation of the scene may be implemented by any architecture and/or computing system. For example, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein.

According to some embodiments, method 200 may commence at step 208 wherein sensor data representative of a perceived scene captured with a sensor is received. The sensor data may be any data received from a sensor. The sensor data may be received by manner of one or both of wired or wireless coupling or communication to the sensor. In some embodiments, the sensor data may be received from the sensor through a communication network. In other embodiments, the sensor data may be stored on one or more remote storage devices and the sensor data may be retrieved from such remote storage device, or a cloud storage site, through one or both of wired or wireless connection.

According to some embodiments, method 200 may comprise step 216 wherein a plurality of nodes is defined based on the received sensor data. Each node represents an object within the scene. Objects may be identified or detected within the sensor data using any known object identification or detection methods, such as semantic segmentation. An example of an object identification or detection method is PointNet disclosed in "PointNet: Deep Learning on Point Sets for 3D Classification and Segmentation" by Qi et. al., wherein an example of the architecture of PointNet may be found at least in Section 4 and FIG. 2 and an example of the training of PointNet may be found at least in Supplementary Section C. Another example of an object identification or detection method is PointNet++ disclosed in "PointNet++: Deep Hierarchical Feature Learning on Point Sets in a Metric Space Point Transformer" by Qi et. al., wherein an example of the architecture of PointNet++ may be found at least in Sections 3.2-3.4, FIG. 2 and Supplementary Section B.1, and an example of the training of PointNet++ may be found at least in Supplementary Section B.3. Another example of an object identification or detection method is KPConv disclosed in "KPConv: Flexible and Deformable Convolution for Point Clouds" by Thomas et. al., wherein an example of the architecture of KPConv may be found at least in Sections 3.3 and 3.4, on the right of FIG. 2, and Supplementary Material Section A and FIGS. 8 and 9, and an example of the training of KPConv may be found at least in Supplementary Material Section A. Examples of datasets that an object identification or detection model may be trained on is the Semantic kitti dataset available at http://www.semantic-kitti.org/dataset.html and the 3D Semantic Instance Segmentation of RGB-D Scans (3D SIS) dataset available at https://github.com/Sekunde/3D-SIS. It is contemplated that any other suitable object identification or detection method and/or dataset may be employed. Once the objects have been identified or detected, the plurality of nodes may be defined, wherein the position of each node is defined based on the spatial position of the object, preferably the centroid position of the object.

Figure 3:
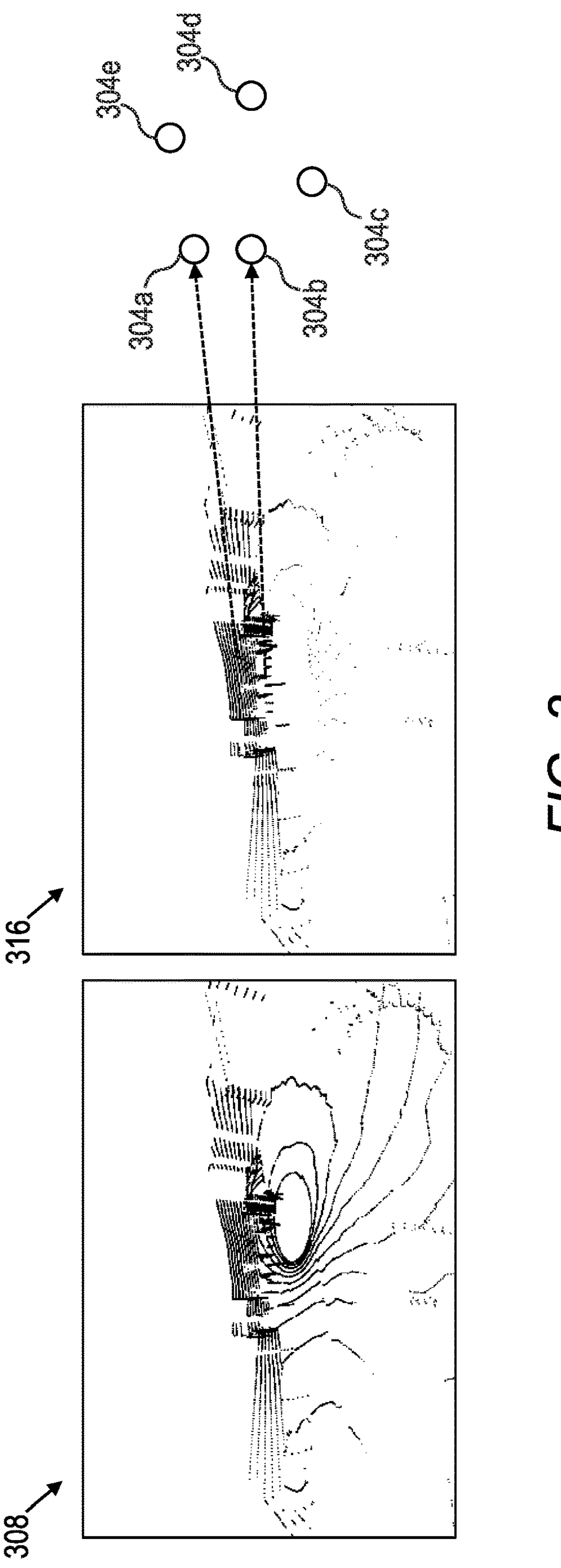
FIG. 3 illustrates an example of a plurality of nodes generated based on received sensor data, in accordance with embodiments of the present disclosure.

FIG. 3 illustrates an example of a plurality of nodes generated based on received sensor data, in accordance with embodiments of the present disclosure. Sensor data depicting a scene captured by a sensor may comprise colour data and/or distance data. Sensor data may be a point cloud or an RGBD image. Image 308 is an example of visualization of sensor data. Object identification or detection is carried out on sensor data using any known methods, such as semantic segmentation which clusters or groups parts of the data together which belongs to the same object class. Image 316 is an example of visualization of the results of object identification or detection, wherein the data has been clustered or grouped based on their object class. A plurality of nodes 304*a* to 304*e* may then be generated based on the results of object identification or detection, wherein each node 304*a* to 304*e* represents an object identified or detected within a scene. For example, node 304*a* may represent a wall detected within the scene, while node 304*b* may represent a bicycle stand detected within the scene. The position of nodes 304*a* to 304*e* may be based on the spatial position of the centroid of each object, and each node may comprise at least one node feature which encode one or more attributes of the object. For example, node 304*a* representing a wall may comprise a class label and a position label. For example, node 304*b* representing a bicycle stand may comprise a class label, a position label, a colour label. Examples of attributes may comprise appearance features such as colour, texture pattern, class name, semantic labels, spatial attributes such as centroid, location of the object in the image. For example, the centroid position of each object may be determined using any known centroid computation algorithms.

Returning to FIG. 2, according to some embodiments, method 200 may comprise step 224 wherein a densely connected graph is created by connecting each node to a number of nearest neighbour nodes. An edge is created between pairs of nodes if the pair of nodes is considered to be "near" or "close". "Nearness" or "closeness" may be measured through any known methods. A known method for measuring "nearness" or "closeness" is k-nearest neighbours, wherein a first node g and a second node h are connected by an edge if first node g is among the k nearest neighbours of second node h, or if second node h is among the k nearest neighbours of first node g, wherein k may be any number.

Figures 4, 5:
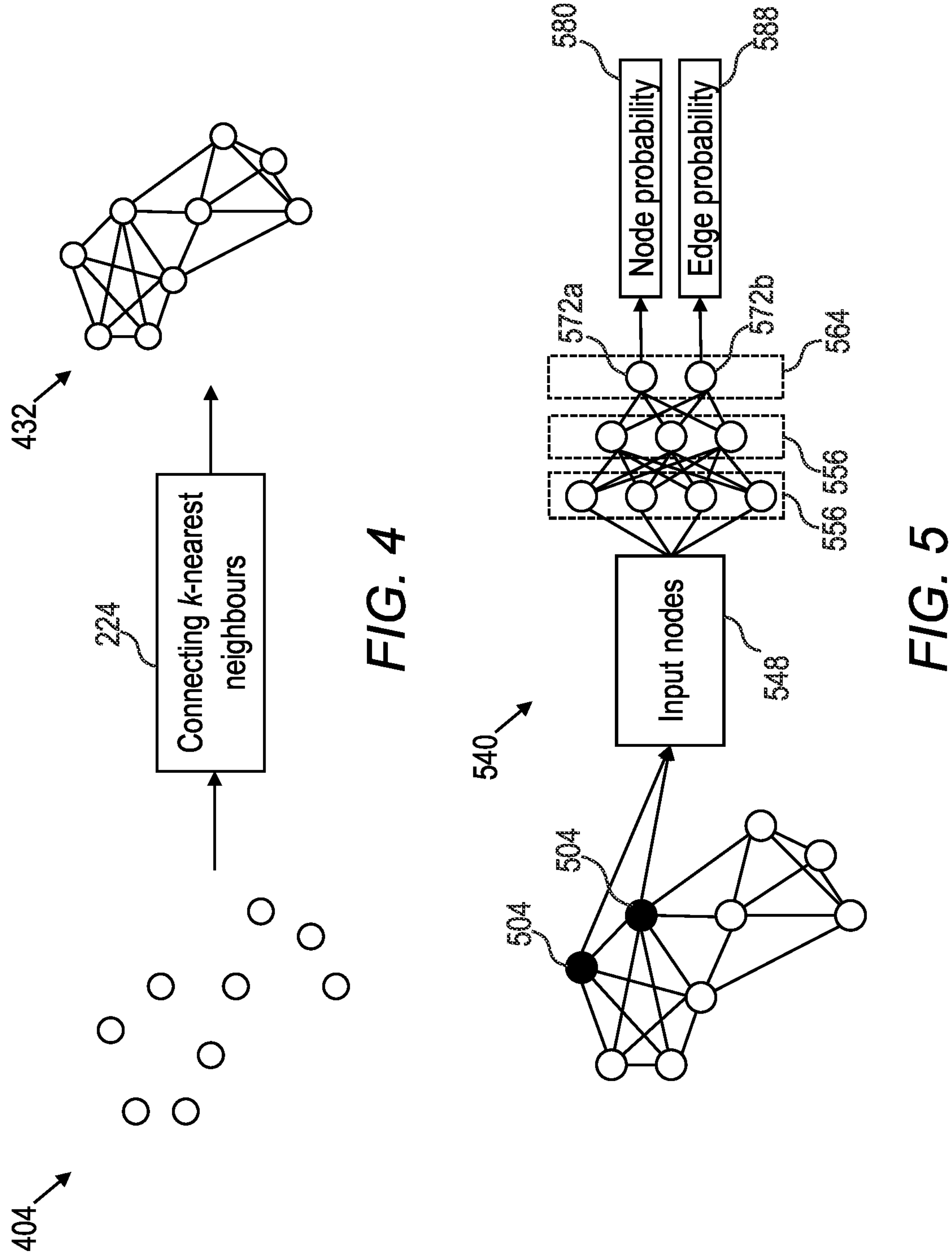
FIG. 4 illustrates an example of the creation of a densely connected graph, in accordance with embodiments of the present disclosure.
FIG. 5 illustrates an example of a prediction of node probability and/or edge probability for pairs of connected nodes of a densely connected graph, in accordance with embodiments of the present disclosure.

FIG. 4 illustrates an example of the creation of a densely connected graph, in accordance with embodiments of the present disclosure. A plurality of nodes 404 is densely connected in step 224 to create a densely connected graph 432.

Returning to FIG. 2, according to some embodiments, method 200 may comprise step 232 wherein at least a node probability is predicted for each pair of connected nodes of the densely connected graph generated in step 224. Node probability represents a probability that the pair of connected nodes represent the same object and is based on how similar the nodes are. The similarity may be based on the one or more attributes encoded within each node as node features and/or the node position of each node. In some embodiments, step 232 may also comprise predicting an edge probability for each pair of connected nodes of the densely connected graph, wherein the edge probability represents a probability of an edge between the pairs of nodes. Any known methods may be used to determine a node probability and/or an edge probability, including traditional classifiers or machine learning algorithm. An example of a traditional classifier is a support vector machine (SVM). Preferably, a trained neural network is used to predict, for each pair of connected nodes, one or both of a node probability and an edge probability. Preferably, the trained neural network has a multilayer perceptron (MLP) architecture. Multilayer perceptrons will be well known to those skilled in the art, and as such are not discussed in detail herein. In general terms, a multilayer perceptron comprises an "input layer" having a plurality of input neurons, one or more "hidden layers" each having a plurality of hidden layer neurons, and an "output layer" having a plurality of output neurons. The hidden layer and output layer neurons are each linked to the neurons in the previous layer and each connection between neurons has an associated weight. Other key elements include an optional bias term, activation, and transfer functions. "Knowledge" within the neural network is stored as the connection weights, and non-linearities and complexities of the model are captured by the activation and transfer functions, and by the number of neurons in the hidden layers, respectively. In some embodiments, the trained neural network may have an output layer comprising two neurons with an activation function, wherein a first neuron outputs a node probability and a second neuron outputs an edge probability. In some embodiments, a softmax layer comprising a softmax function, also known as normalized exponential function, may be used to derive the desired probabilistic outputs for node probability and/or edge probability. The softmax layer or function is a known tool that maps the range of $\{z: -\infty, \ldots, \infty\}$ to [0,1] by normalising the input into a probability distribution. It is noted that the node probability and edge probability are independent and non-exclusive, and therefore may not sum up to 1. Preferably, the activation function is a sigmoid activation function as the output is a probability, although any other suitable activation functions may be employed. In other embodiments, the trained neural network may output a matrix of 2×2 values, wherein a first row will represent a probability that the pair of nodes represent the same object and a probability that the pair of nodes represent different objects, and a second row will represent a probability that an edge exists between the pair of connected nodes and a probability that an edge does not exist between the pair of connected nodes, wherein the probabilities of each of the rows will add up to 1.

FIG. 5 illustrates an example of a prediction of node probability and/or edge probability for pairs of connected nodes of a densely connected graph, in accordance with embodiments of the present disclosure. As illustrated in FIG. 5, pairs of connected nodes 504 are input into a trained neural network 540. In some embodiments, each node may be a 1024D vector. In some embodiments, pairs of connected nodes 504 may be aggregated before being passed to trained neural network 540. In some embodiments, trained neural network 540 may comprise an input layer 548, one or more hidden layers 556, and an output layer 564. As illustrated in FIG. 5, output layer 564 may comprise a first output layer neuron 572*a* and a second output layer neuron 572*b*, wherein each output layer neuron 572*a* and 572*b* comprises a sigmoid activation function such that a node probability 580 and an edge probability 588 are output respectively.

According to some embodiments, trained neural network 540 may have a multilayer perceptron (MLP) architecture wherein each layer 548, 556 and 564 comprises one or more neurons, and each neuron of the one or more hidden layers 556 and output layer 564 is linked or connected to neurons in the previous layer. Table 1 below illustrates an example of the architecture of trained neural network 540 with a multilayer perceptron architecture. When training neural network 540 with a multilayer perceptron architecture, the activation functions may be set to be the commonly used sigmoid activation function or ReLU activation function and the weights may be randomly initialized to numbers between 0.01 and 0.1, while the biases may be randomly initialized to numbers between 0.1 and 0.9.

TABLE 1

| Layer | Input and output size | Number of parameters (weights) | Number of parameters (Biases) |
|---|---|---|---|
| Input layer | 1024, 512 | 524288 | 512 |
| Hidden layer 1 | 512, 256 | 131072 | 256 |
| Hidden layer 2 | 256, 128 | 32768 | 128 |
| Output layer | 128, 2 | 256 | 2 |
| Total | | 689282 | |

According to some embodiments, the trained neural network 540 may have a graph neural network (GNN) architecture, wherein the one or more hidden layers 556 are graph layers, wherein convolutional operator, recurrent operator, sampling module and skip connection are used to propagate information in each graph layer. In some embodiments, convolution operator, recurrent operator and skip connection operation may be part of a propagation module used to propagate information between nodes so that the aggregated information could capture both feature and topological information. In some embodiments, the convolution operator and recurrent operator may be used to aggregate information from neighbours while the skip connection operation may be used to gather information from historical representations of nodes and mitigate the over-smoothing problem. In some embodiments, the sampling module may be included to conduct propagation, and may be combined with the propagation module. In some embodiments, the pooling module may be used to extract information from nodes where the representations of high-level subgraphs or graphs is required. Table 2 below illustrates an example of the architecture of trained neural network 540 with a graph neural network architecture. When training neural network 540 with a graph neural network architecture, the activation functions may be set to be the commonly used sigmoid activation function or ReLU activation function and the weights may be randomly initialized to numbers between 0.01 and 0.1, while the biases may be randomly initialized to numbers between 0.1 and 0.9.

TABLE 2

| Layer | Input and output size | Number of parameters (weights) | Number of parameters (Biases) |
|---|---|---|---|
| GNN layer 1 | 1024, 512 | 524288 | 512 |
| GNN layer 1 | 512, 128 | 65536 | 128 |
| GNN layer 3 | 128, 2 | 256 | 2 |
| Total | | 590722 | |

Returning to FIG. 2, method 200 may comprise step 240 wherein a graph representation of the perceived scene is generated based at least on the densely connected graph, and the predicted node probability. In some embodiments, where the predicted node probability between a pair of connected nodes is above a first threshold, the pair of connected nodes may be merged and the edge connecting the pair of nodes may be removed. The first threshold may be user-defined or may be automatically defined. In some embodiments, the first threshold may be adjusted based on the accuracy of the generated graph representation. Preferably, the first threshold is above 0.7. In some embodiments, where the predicted node probability between a pair of connected nodes is below the first threshold, the pair of connected nodes and the edge connecting the pair of nodes may be retained.

According to some embodiments, where an edge probability is predicted in step 232, the graph generated in step 240 may be further based on the predicted edge probability. In some embodiments, an edge connecting a pair of connected nodes may be removed where the predicted edge probability between the pair of connected nodes is below a second threshold. The second threshold may be user-defined or may be automatically defined. In some embodiments, the second threshold may be adjusted based on the accuracy of the generated graph representation. Preferably, the second threshold is below 0.5.

Figure 6:
FIG. 6 is a schematic illustration of a method of defining a plurality of nodes based on sensor data received, in accordance with embodiments of the present disclosure.
Figure 6:
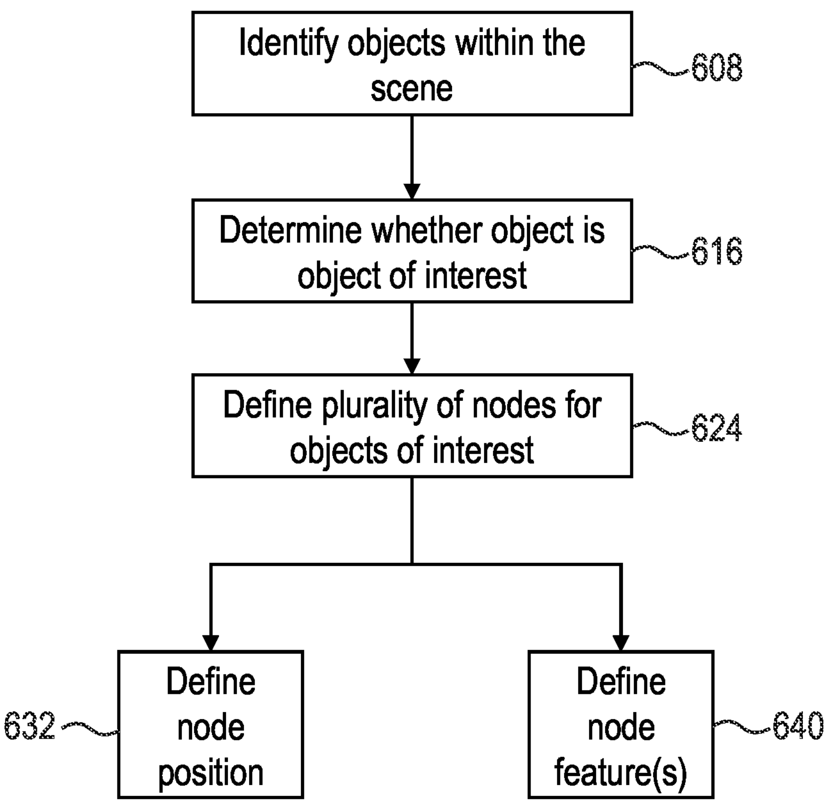

FIG. 6 is a schematic illustration of a method of defining a plurality of nodes based on sensor data received in step 216 in method 200, in accordance with embodiments of the present disclosure. In some embodiments, method 600 of defining a plurality of nodes may be implemented in step 216 of method 200.

According to some embodiments, method 600 may comprise step 608 wherein one or more objects are identified within the perceived scene based on the received sensor data. Any known object recognition or identification methods may be employed. For example, semantic segmentation which clusters or groups parts of the data together which belongs to the same object class, may be employed.

According to some embodiments, method 600 may comprise step 616 wherein it is determined whether an object identified in step 608 is an object of interest. Any known object classification algorithm may be employed. An example of an object classification algorithm may be found in "Frustum PointNets for 3D Object Detection from RGB-D Data" by Qi et. al., wherein an example of the architecture may be found at least in Section 4.2 and 4.2 and FIG. 2 and Supplementary Section B.1 and FIG. 8, and an example of the training may be found at least in Supplementary Section B.2. Another example of an object classification algorithm may be found in "VoxelNet: End-to-End Learning for Point Cloud Based 3D Object Detection" by Yin Zhou and Oncel Tuzel. Examples of datasets that an object classification model may be trained on is the Semantic kitti dataset available at http://www.semantic-kitti.org/dataset.html, the ScanNetV2 dataset available at http://www.scan-net.org/. and the nuScenes dataset available at https://www.nuscenes.org/nuscenes. It is contemplated that any other suitable object classification algorithm and/or dataset may be employed. Preferably, objects of interest are static objects, or stationary objects as such objects are generally unchanging over multiple observations and thus would allow aggregation or accumulation of the graph representation. Changes observed in static objects over time are negligible and static objects are generally unaffected by environmental conditions such as the weather. Furthermore, graph representations encoding static or stationary objects may be used in subsequent applications, such as autonomous driving tasks like loop closure or visual place recognition. Examples of static objects include walls, bicycle stands, poles, tree trunks, sidewalks, and buildings.

According to some embodiments, method 600 may comprise step 624 wherein a plurality of nodes is defined, and wherein each node corresponds to an object of interest determined in step 616. In some embodiments, each object of interest may be assigned a node and any other detected or segmented objects may be ignored and/or discarded.

According to some embodiments, method 600 may comprise step 632 wherein a node position is defined. The node position may be based on a spatial position of the corresponding object of interest. Preferably, the node position corresponds to a centroid position of the corresponding object of interest.

According to some embodiments, method 600 may comprise step 640 wherein one or more node features are defined. Node features comprise one or more attributes of the corresponding object of interest. Examples of attributes may comprise appearance features such as colour, texture pattern, class name, and semantic labels, and spatial attributes such as centroid, location of the object in the image, as well as spatial relationship of the object in relation to other objects.

Figure 7:
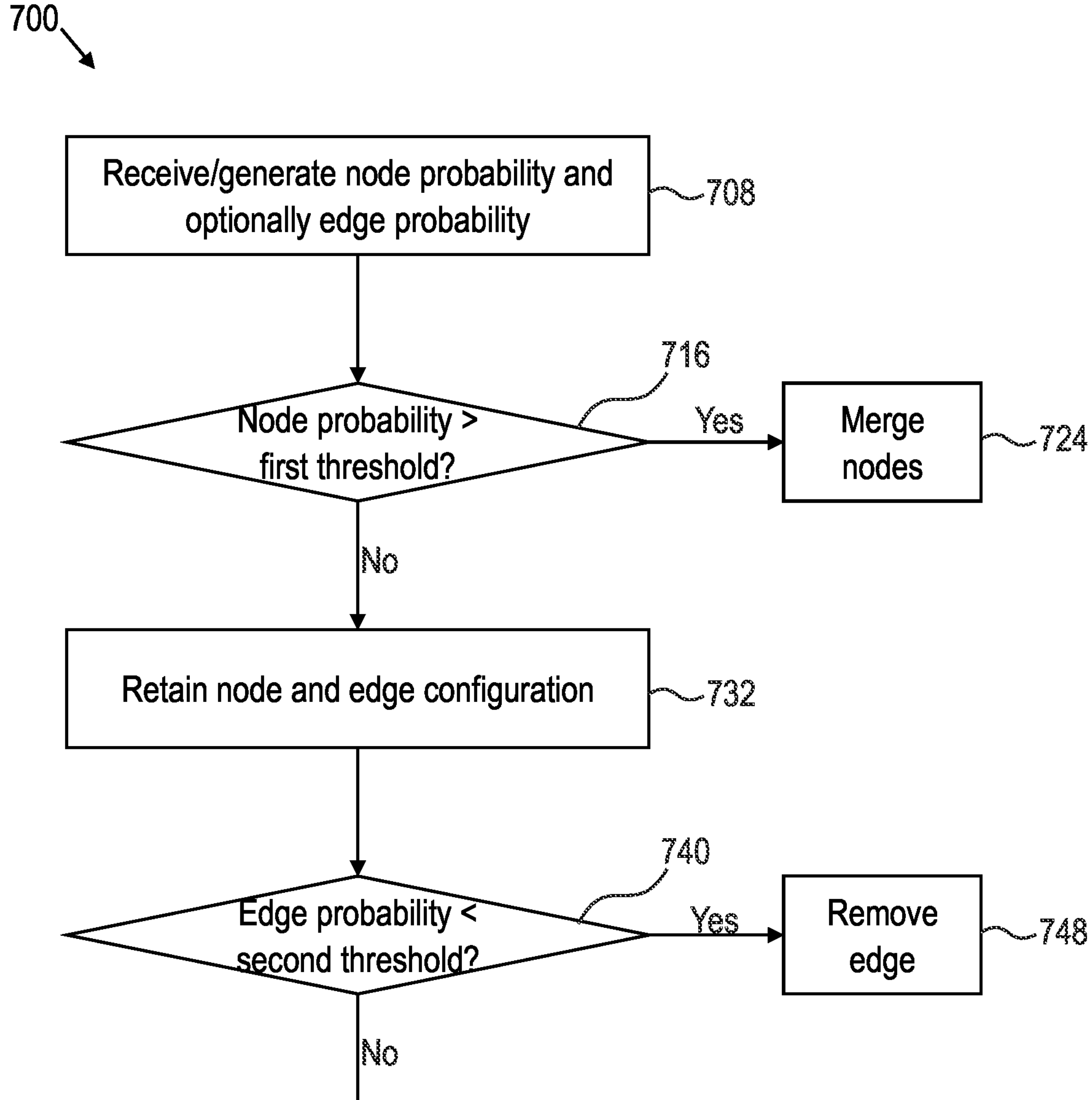
FIG. 7 is a schematic illustration of a method of generating a graph representation of a scene based on a densely connected graph, a node probability, and optionally an edge probability, in accordance with embodiments of the present disclosure.

FIG. 7 is a schematic illustration of a method of generating a graph representation of a scene based on a densely connected graph, a node probability, and optionally an edge probability, in accordance with embodiments of the present disclosure. Method 700 of generating a graph representation may be carried out between each pair of connected nodes at step 240 of method 200. Method 700 may commence with step 708 wherein a node probability and optionally an edge probability is received or generated.

According to some embodiments, method 700 may comprise step 716 wherein it is determined whether the node probability is above a first threshold. If the node probability is above the first threshold, the pair of connected nodes will be merged in step 724. If the node probability is below the first threshold, the pair of nodes and edge configuration will be retained in step 732.

According to some embodiments, where an edge probability is received or generated in step 708, method 700 may optionally comprise determining whether the edge probability is below a second threshold. If the edge probability is below the second threshold, the edge connecting the pair of connected nodes will be removed in step 748. If the edge probability is above the second threshold, the pair of nodes and edge configuration will be retained in step 756. Method 700 may be repeated for all pairs of connected nodes to generate the graph representation of the scene.

Figure 8:
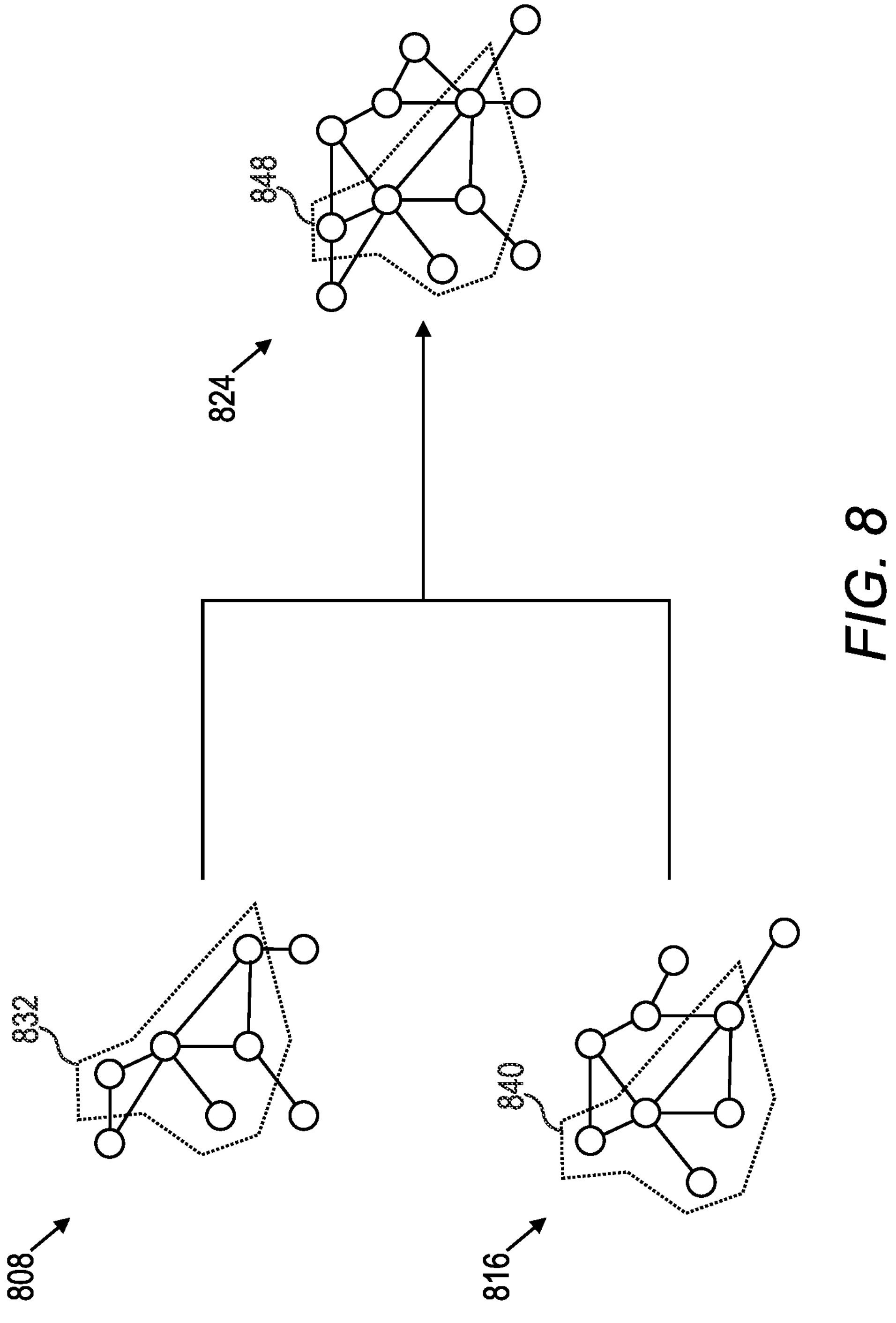
FIG. 8 is a high-level schematic illustration of a method of generating a graph representation of a scene from a first observation and a second observation of the scene, in accordance with embodiments of the present disclosure.

FIG. 8 is a high-level schematic illustration of a method of generating a graph representation of a scene from a first observation and a second observation of the scene, in accordance with embodiments of the present disclosure. According to some embodiments, a graph representation of a scene may be generated from a first observation and a second observation of the scene. A first graph representation 808 may be generated from a first observation of the scene, and a second graph representation 816 may be generated from a second observation of the scene. The first graph representation 808 and second graph representation 816 may be aggregated and/or accumulated to generate a larger third graph representation 824 of the scene which comprises all the nodes and connecting edges of the first graph representation 808 and second graph representation 824. As illustrated in FIG. 8, the nodes and connecting edges in the region 832 of the first graph representation 808 and the nodes and connecting edges in the region 840 of the second graph representation 816 are similar, and these nodes and connecting edges are also found in region 848 of third graph representation 848.

Figure 9:
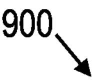
FIG. 9 is a schematic illustration of a method of generating a graph representation of a scene from a first observation and a second observation of the scene, in accordance with embodiments of the present disclosure.
Figure 9:
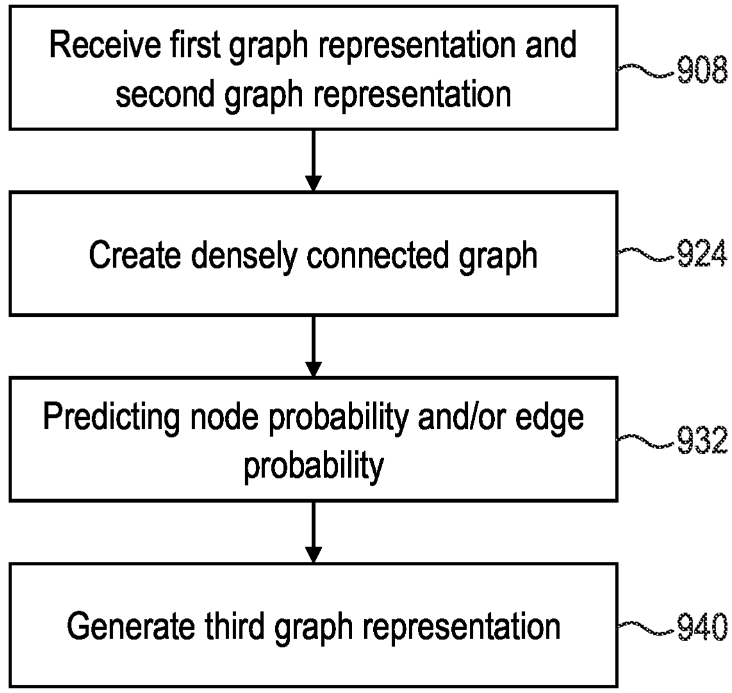

FIG. 9 is a schematic illustration of a method of generating a graph representation of a scene from a first observation and a second observation of the scene, in accordance with embodiments of the present disclosure. Method 900 of generating a graph representation of a scene from a first observation and a second observation of the scene may be implemented by any architecture and/or computing system. For example, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein.

According to some embodiments, method 900 may commence at step 908 wherein a first graph representation generated from a first observation and a second graph representation generated from a second observation are received. The first graph representation and second graph representation may be received by manner of one or both of wired or wireless coupling or communication. In some embodiments, the first graph representation and second graph representation may be received through a communication network. In other embodiments, the first graph representation and second graph representation may be stored on one or more remote storage devices, and the first graph representation and second graph representation may be retrieved from such remote storage device, or a cloud storage site, through one or both of wired or wireless connection. According to some embodiments, the first graph representation and second graph representation may each comprise a plurality of connected nodes and are presented on a single coordinate system. In some embodiments, the first graph representation and/or second graph representation may be generated from the first observation or second observation respectively using method 200 of generating a graph representation of a scene based on a single observation of the scene.

According to some embodiments, method 900 may comprise step 924 wherein a densely connected graph is created by each node to a number of nearest neighbour nodes, step 932 wherein a node probability and optionally an edge probability is predicted for each pair of connected nodes of the densely connected graph, and step 940 wherein a third graph representation is generated based at least on the densely connected graph, and the predicted node probability and, optionally, the edge probability. Steps 924 to 940 of method 900 generally correspond to steps 224 to 240 of method 200, and any discussion in relation to steps 224 to 240 of method 200 also apply to steps 924 to 940 of method 900.

Figure 10:
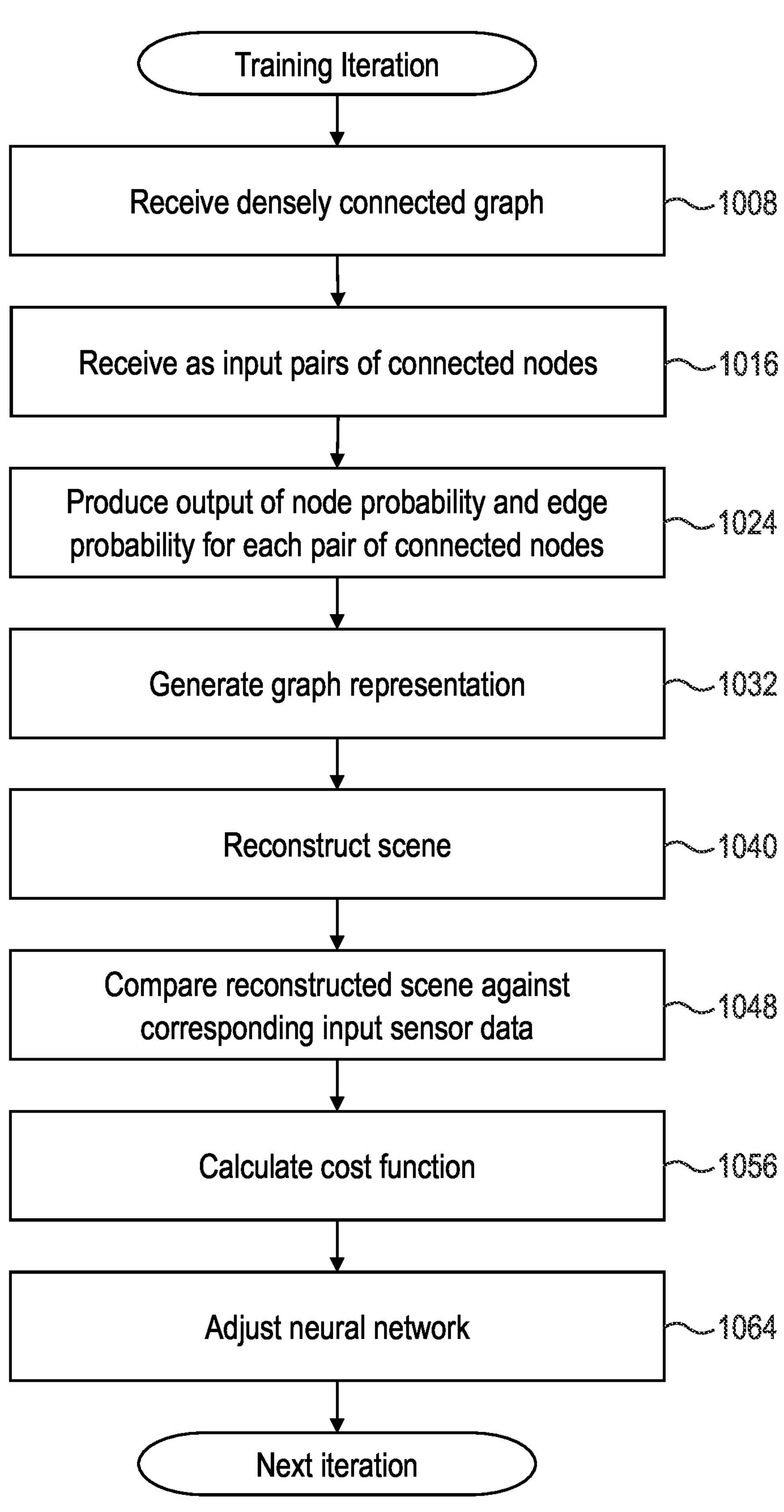
FIG. 10 is a schematic diagram illustrating the main steps to train a neural network for predicting a node probability and an edge probability for a graph representation of a scene, in accordance with embodiments of the present disclosure.

FIG. 10 is a schematic diagram illustrating the main steps to train a neural network for predicting a node probability and an edge probability for a graph representation of a scene, in accordance with embodiments of the present disclosure. Neural network 540 may be trained on a training dataset comprising a plurality of densely connected graphs generated from a plurality of sensor data captured from a plurality of scenes, wherein each densely connected graph is generated from a plurality of nodes defined for each input sensor data by connecting each node to a number of nearest neighbour nodes. In some embodiments, the training dataset may be generated by receiving a plurality of sensor data captured from a plurality of scenes, and defining, for each input sensor data, a plurality of nodes and creating a densely connected graph by connecting each node to a number of nearest neighbour nodes, wherein each node represents an object within the scene. The densely connected graphs may each be generated using steps 216 and 224 of method 200. For example, sensor data on which the densely connected graphs of the training dataset are generated may be the Semantic kitti dataset available at http://www.semantic-kitti.org/dataset.html or the 3D Semantic Instance Segmentation of RGB-D Scans (3D SIS) dataset available at https://github.com/Sekunde/3D-SIS. It is contemplated that any other suitable dataset of sensor data may be employed. As shown in FIG. 10, an iteration of the training process for a single densely connected graph generated from sensor data of a single observation of a scene begins at step 1008 where neural network 540 receives a densely connected graph. The densely connected graph may be received through a communication network. In other embodiments, the densely connected graph may be stored on one or more remote storage devices and the densely connected graph may be retrieved from such remote storage device, or a cloud storage site, through one or both of wired or wireless connection. It should be appreciated that the neural network may be configured to advantageously receive and process a plurality of densely connected graphs in parallel.

At step 1016, pairs of connected nodes are passed to one or more input neurons of the input layer 548 of neural network 540.

At step 1024, the input data of each node of a pair of connected nodes is passed through the hidden layers 526 of the neural network 540 to output a node probability 580 and an edge probability 588 for each pair of connected nodes.

At step 1032, a graph representation is generated based on the densely connected graph received in step 1008, and the node probability 580 and edge probability 588 predicted in step 1024. Preferably, the graph representation is generated using method 700.

At step 1040, a scene is reconstructed based on the generated graph representation. According to some embodiments, the scene may be reconstructed using any known image reconstruction method. In some embodiments, the image construction method may be a graph neural network which aggregates attributes from k-neighbouring nodes to reconstruct an image and/or point clouds. A first example of an image construction method may be found in "Generate Point Clouds with Multiscale Details from Graph-Represented Structures" by Yang et. al., wherein an example of the image construction method may be found at least in Section 3 and FIG. 2, and an example of the training of the image construction method may be found at least in Section 4.1. A second example of an image construction method may be found in "Graph2Pix: A Graph-Based Image to Image Translation Framework" by Gokay et. al., wherein an example of the image construction method may be found at least in Section 3 and FIG. 2, and an example of the training of the image construction method may be found at least in Section 4.1 subsection "Experimental Setup". A third example of an image construction method may be found in "3D Point Cloud Generative Adversarial Network Based on Tree Structured Graph Convolutions" by Shu et. al., wherein an example of the image construction method may be found at least in Sections 3 and 4, and FIGS. 2 to 5, and an example of the training of the image construction method may be found at least in Section 7 subsection "Implementation details". Any dataset with pairs of point clouds and scene graph ground truth may be used to train the image construction method, including synthetic data. An example of a dataset that may be used to train the image construction method is the dataset generated using the method disclosed in "Learning 3D Semantic Scene Graphs from 3D Indoor Reconstructions" by Wald et. al., available at https://3dssg-.github.io/. It is contemplated that any other suitable image construction method and/or dataset may be employed.

At step 1048, the scene reconstructed in step 1040 is compared against the reconstructed scene against the corresponding input sensor data from which the received densely connected graph was generated. This comparison would reveal any similarities and differences between the reconstructed scene and the corresponding input sensor data from which the received densely connected graph was generated and identify any "mistakes" by the neural network 540. Examples of "mistakes" include incorrect edge predictions that lead to incorrect spatial reconstruction in the reconstructed scene, incorrect node predictions that lead to duplicate or incorrect objects in the reconstructed scene.

At step 1056, a cost function that enforces consistency between the reconstructed scene and the corresponding input sensor data is determined. Examples of cost functions that may be used where the reconstructed scene is a point cloud include Chamfer distance (CD) which is a nearest-neighbour-based method and Earth Mover's distance which relies on solving an optimization problem to find the least expensive one-to-one transportation flow between two point clouds. An example of a cost function that may be used where the reconstructed scene is an image is the L2 loss function, also known as Squared Error Loss, which is the squared difference between a prediction and the actual value, calculated for each example in a dataset. In some embodiments, reconstructed scene and the corresponding input sensor data may be compared using a discriminator to differentiate between the reconstructed scene and the input sensor data.

At step 1064, the neural network 540 may be adjusted by using the cost function determined in step 1056. The neural network may be adjusted by backpropagating the cost function determined in step 1056 to update the weights and biases using an AdamOptimizer. In some embodiments, neural network 540 may be trained with a learning rate of 0.001 and weight decay of 0.0005.

According to some embodiments, the neural network 540 may be trained from scratch for 50 to 100 epochs, although the number of epochs may vary depending on the size of the training dataset and/or the size of neural network 540.

Finally, the language used in the specification has been principally selected for readability and instructional purposes, and it may not have been selected to delineate or circumscribe the inventive subject matter. It is therefore intended that the scope of the application be limited not by this detailed description, but rather by any claims that issue on an application based here on. Accordingly, the embodiments of the present application are intended to be illustrative, but not limiting, of the scope of the application, which is set forth in the following claims.

The invention claimed is:

1. A computer-implemented method of generating a graph representation of a scene based on a single observation of the scene, said graph representation comprising a plurality of nodes and edges, wherein a node represents an object within the scene, and wherein an edge connects pairs of nodes of the plurality of nodes and represents a spatial relationship between objects within the scene, the method comprising:

receiving sensor data representative of a perceived scene captured with a sensor;

defining a plurality of nodes based on the received sensor data;

creating a densely connected graph by connecting each node to a number of nearest neighbour nodes;

predicting, for each pair of connected nodes of the densely connected graph, at least a node probability, wherein the node probability represents a probability that the pair of connected nodes represent the same object; and generating a graph representation of the perceived scene based at least on the densely connected graph, and the predicted node probability.

2. The computer-implemented method of claim 1, wherein defining a plurality of nodes based on the captured perceived scene comprises:

identifying one or more objects within the perceived scene based on the received sensor data;

determining whether each identified object is an object of interest, wherein an object of interest is preferably a static object; and defining a plurality of nodes, wherein each node corresponds to an object of interest within the perceived scene.

3. The computer-implemented method of claim 1, further comprising merging the pair of connected nodes when the node probability is above a first threshold.

4. The computer-implemented method of claim 1, further comprising removing an edge from between the pair of nodes when an edge probability of the edge between the pair of nodes is below a second threshold.

* * * * *